Patented Feb. 2, 1954

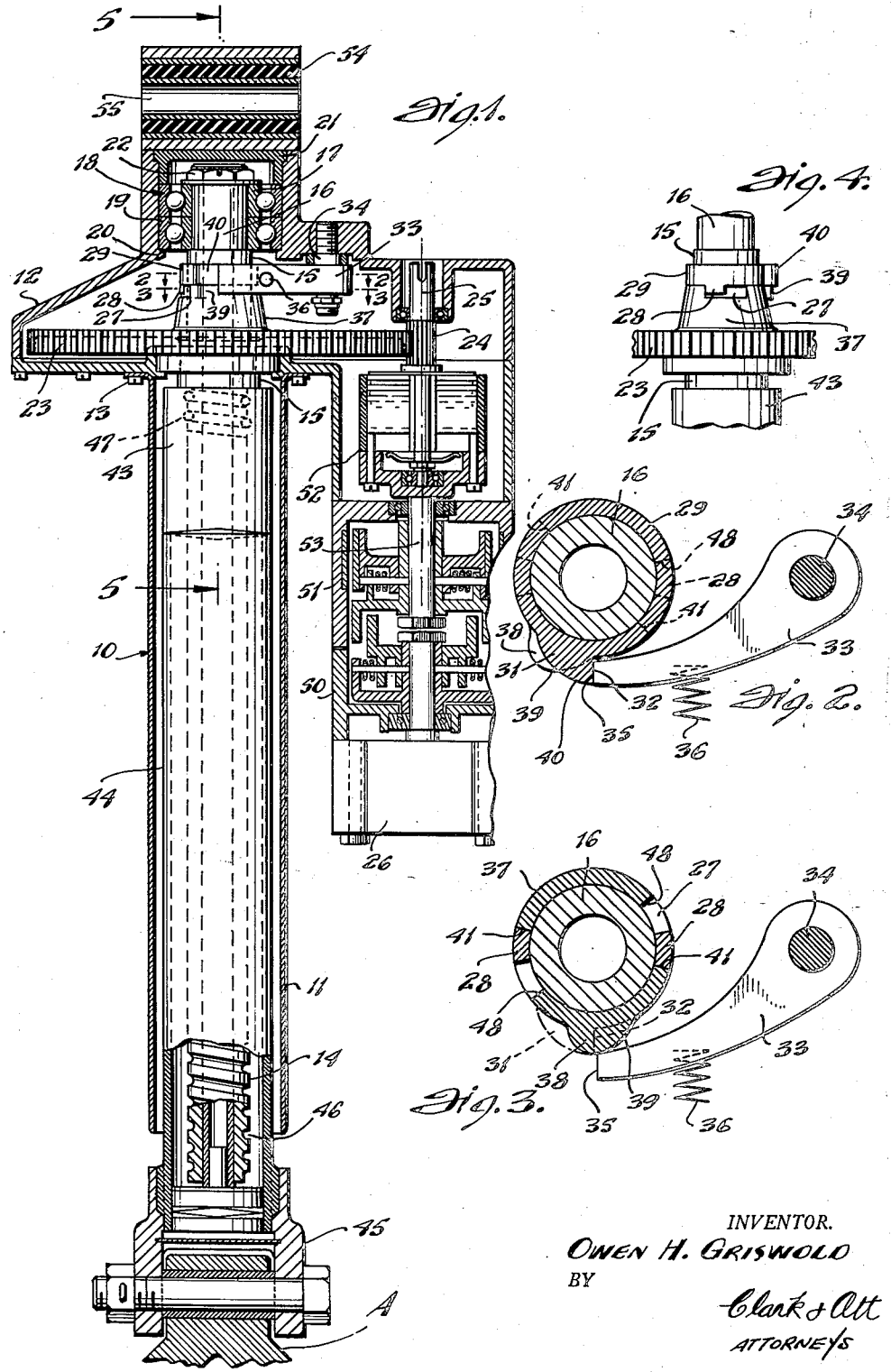

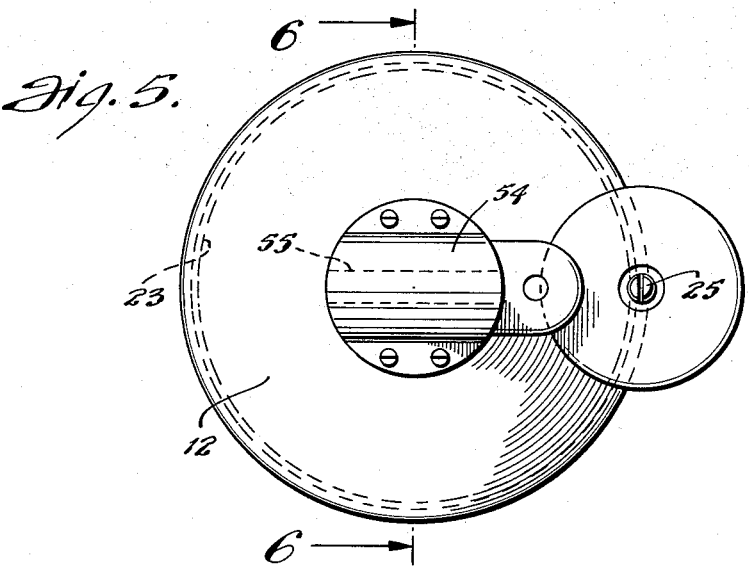
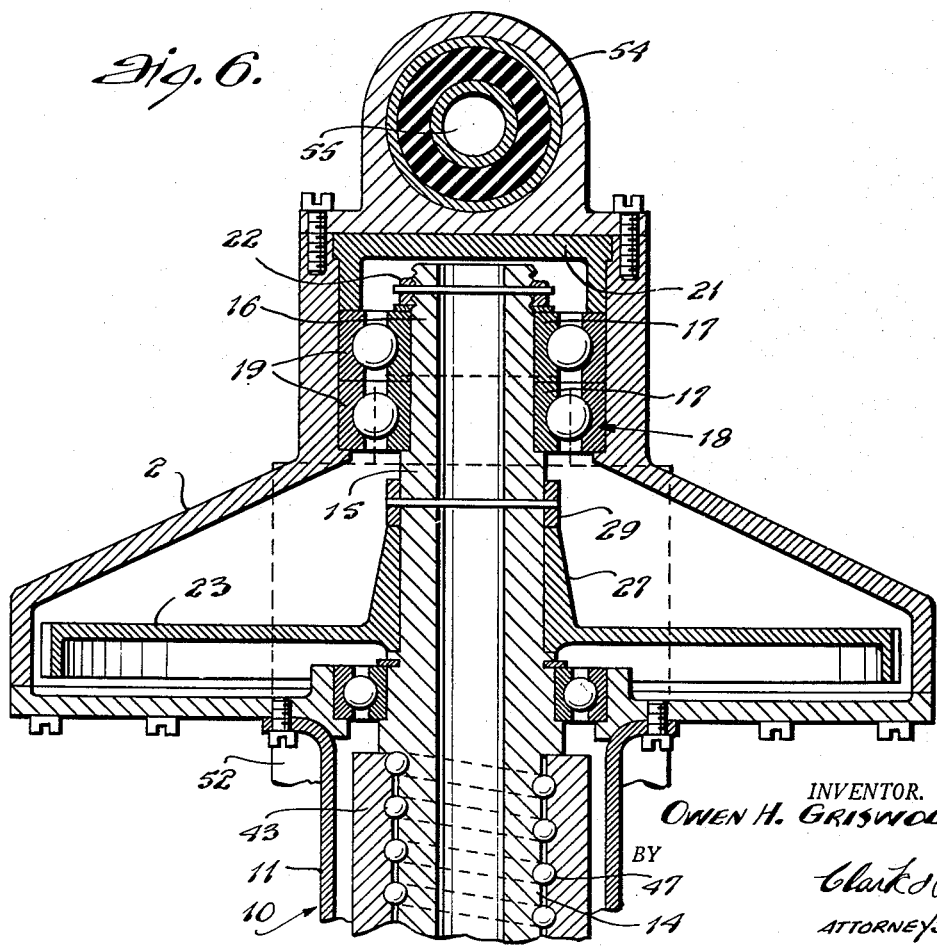

2,667,953

UNITED STATES PATENT OFFICE 2,667,953

LANDING GEAR ACTUATOR

Owen H. Griswold, Ridgewood, N. J., assignor to Air Associates, Incorporated, Teterboro, N. J., a corporation of New Jersey Application March 18, 1949, Serial No. 82,068

6 Claims. (Cl. 192—3.5)

This invention relates to retractable landing gear for aircraft and has particular reference to an actuator therefor which is constructed and arranged to permit of gravity projection of the landing gear.

The invention has in view a landing gear actuator which is adapted to effect the rapid extension or projection of the landing gear without the use of motor power for turning the lead screw to thereby insure the extension or projection of the landing gear even though the power in the aircraft has failed.

Still another object of the invention is to provide a landing gear actuator in which the weight of the landing gear and the connecting mechanism functions to rotate the lead screw to permit of the "free fall" extension or projection of the landing gear upon release of the landing gear from retracted latched condition.

Still another object of the invention is to provide a landing gear actuator which is constructed for raising the landing gear by motor power located within the plane and for extending or projecting the landing gear without the use of motor power.

Still another object of the invention is to provide a landing gear actuator having camming mechanism for preventing retraction of the landing gear by the upward thrust on the lead screw due to the weight of the aircraft transmitted to the landing gear through the actuator.

With the foregoing and other objects in view, reference is now made to the following specification and accompanying drawings in which the preferred embodiment of the invention is illustrated.

In the drawings:

Fig. 1 is a view in elevation of a landing gear actuator constructed in accordance with the invention and showing parts thereof in section.

Fig. 2 is an enlarged fragmentary transverse sectional view taken approximately on line 2—2 of Fig. 1 showing the relative location of the cam mechanism when the landing gear is in projected relation and retained against retraction by the weight imposed thereon.

Fig. 3 is a similar view showing the location of the cam mechanism during retraction of the landing gear by the motor power of the aircraft.

Fig. 4 is a view in elevation of the upper portion of the lead screw.

Fig. 5 is a top plan view of the actuator.

Fig. 6 is a fragmentary vertical sectional view taken approximately on line 6—6 of Fig. 5.

Referring to the drawings by characters of reference, the landing gear actuator includes a housing 10 consisting of an elongated cylindrical lower portion 11 and an enlarged upper portion 12 secured to the lower portion by bolts 13 or equivalent fastening means. Arranged axially within the cylindrical lower portion 11 is a lead screw 14 which projects through the lower end thereof and is formed with a cylindrical shank 15 at its upper end extending into the enlarged upper portion 12 of the housing. The shank 15 has its upper end portion 16 reduced in diameter which reduced portion is fitted within the inner race portions 17 of bearings 18 with the outer race portions 19 thereof positioned between the annular shoulder 20 of the housing and the peripheral flange of a thrust element 21 located within the upper portion 12 of the housing with a nut 22 threadedly engaged on the reduced portion 16 of the shank protruding through the bearings.

Mounted on the shank 15 of the lead screw 14 is a spur gear 23 which is engaged by a pinion 24 mounted for rotation on a shaft 25 having its axis disposed in parallel relation with the axis of the lead screw 14 and which shaft is adapted to be connected with the driving shaft of a motor 26.

The hub of the gear 23 is formed with oppositely disposed rectangular recesses 27 formed in the upper edge thereof and projecting into said recesses are rectangular dogs 28 depending from an annular member 29 affixed to the shank 15 with the lower annular face thereof in bearing engagement upon the upper annular edge of the hub of the gear 23. The relative arcuate length of the dogs 28 and the recesses 27 is such as to permit of relative movement of the lead screw 14 and the gear 23 through an arc of approximately thirty degrees. The interengagement of the dogs in the said recesses effects turning of the lead screw 14 by the rotation of the gear 23 when the pinion 24 is operatively connected with the driving shaft of the motor power to turn therewith.

In order to provide for independent rotation of the lead screw 14, a cam 31 is formed on the periphery of the annular member 29 and is provided with a radially disposed face 32. A pawl 33 is pivoted to the housing on a pivot pin 34 and the same is formed with a radially disposed forward end 35 adapted to engage the radial face 32 of the cam 31 for preventing counter-clockwise movement of the lead screw 14. A coiled spring 36 is arranged between the pawl 33 and the housing for tensioning the pawl against the annular face of the annular member 29.

The hub 37 of the gear 23 is provided with a cam 38 on the periphery thereof which has its cam edge 39 oppositely curved from the cam edge 40 of the cam 31 and with the high point of the cam 38 located below and in alignment with the high point of the cam 31 when the dogs 28 are in engagement against one of the ends of the recesses 27 respectively. The cam 38 is disposed so as to engage the pawl 33 and move the same outwardly beyond the high point of the cam 31 when the gear 23 is rotated in a counter-clockwise direction. The pawl 33 is thereby moved outwardly against the tension of the spring 36 to free the end face 35 from the face 32 of the cam 31 whereby the lead screw 14 will turn in a counter-clockwise direction with the turning of the gear 23. When this takes place, the dogs 28 are disposed against the ends 41 of the recesses 27.

Arranged within the cylindrical lower portion 11 of the housing is a nut 43 to which is affixed a depending tubular shaft 44 protruding through the open lower end of the housing and having a yoke 45 affixed to the protruding end thereof which yoke is swingably connected with the struts of the landing gear indicated generally by the reference character A for raising and lowering the same with the upward and downward movement of the nut 43 and the shaft 44 within the lower portion 11 of the housing. The lead screw 14 is provided with a high pitch screw thread 46 on the periphery thereof which extends from its lower end to the shank 15. The nut 43 is formed on the inner annular face thereof with a complementary high pitch screw thread 47 and the same is threadedly engaged on the lead screw 14 to permit of reciprocatory movement of the nut 43 and tubular shaft 44 with the turning of the lead screw 14. The pitch of the screw thread on the lead screw 14 and in the nut 43 is such that the weight of the landing gear will function to rotate the lead screw 14 upon release of the landing gear from retracted latched relation. This permits of the automatic movement of the landing gear from retracted position to extended or projected relation by gravity or the "free fall" movement of the landing gear.

When the landing gear is in extended or projected relation and the same is to be retracted, the motor 26 through the pinion 24 and gear 23 rotates the lead screw 14 in a counter-clockwise direction. This positions the dogs 28 against the ends 41 of the recesses 27 so that the pawl 33 is moved outwardly by the cam 38 during each revolution of the lead screw to prevent the pawl engaging against the face 32 of the cam 31. Rotation of the lead screw 14 in a counter-clockwise direction moves the nut 43 upwardly thereon so as to raise or retract the landing gear. The landing gear is provided with the usual latch mechanism (not shown) which automatically engages when the landing gear is moved to retracted relation to retain the same in retracted latched condition. The latching mechanism also includes a limit switch which functions to break the circuit with the motor 26 to discontinue rotation of the lead screw 14 and the upward movement of the landing gear.

When the landing gear is in retracted position and the same is to be moved to extended or projected relation, the latch retaining the landing gear in retracted relation is released by the operator and the weight of the landing gear on the nut 43 effects rotation of the lead screw 14 in a clockwise direction whereby the nut 43 and the landing gear will descend to thus project the landing gear. During the rotation of the lead screw 14 in a clockwise direction to project the landing gear, the cam 31 functions to swing the pawl 33 outwardly during each revolution of the lead screw. When the landing gear is in extended or projected relation, the upward thrust on the nut 43 due to the weight of the aircraft imposed on the lead screw 14 will tend to force the nut 43 upwardly and to turn the lead screw 14 in a counter-clockwise direction. When this takes place, the dogs 28 engage against the ends 48 of the recesses 27 as illustrated in Figs. 2 and 3 of the drawings, whereby the cam 31 is moved out of alignment with the cam 38 so that the pawl 33 is free to move inwardly by the pressure of the spring 36 to thereby engage against the face 35 of said cam and prevent counter-clockwise rotation of the lead screw 14 and lock or retain the landing gear in projected relation.

Mounted on the driving shaft of the motor is a centrifugal clutch 50 to which is connected a centrifugal brake 51 and an overload clutch 52 connected with the pinion shaft 25. The clutch parts of the centrifugal clutch 50 are normally disengaged and automatically engage when the motor attains a predetermined speed. This drives the shaft 53 to which one of the parts of the centrifugal brake 51 is affixed and said shaft transmits rotary motion through the overload clutch 52 to the shaft 25 and pinion 24.

The clutch parts of the overload clutch 52 are normally engaged and function to prevent the transmission of power which would impose an excess load on the lead screw 14 that might damage the lead screw or the rotating parts. During the free-fall extension or projection of the landing gear, the centrifugal brake 51 functions to prevent an excess rate of turning of the lead screw or extension of the landing gear by virtue of the braking action of the centrifugal brake. It will be understood that the clutch parts of the centrifugal clutch 50 being normally disengaged, the turning of the lead screw during extension or projection of the landing gear is not imparted to the motor shaft so that during projection of the landing gear the lead screw rotates independently of the motor.

The actuator is adapted to be supported for limited swinging movement with the movement of the landing gear to and from extended or projected relation and for this purpose the upper portion 12 is provided with a head 54 having a bearing opening 55 extending transversely therethrough adapted to receive a supporting shaft (not shown) affixed to the aircraft.

What is claimed is:

1. In a landing gear actuator, a high pitch lead screw mounted for turning movement in opposite directions, a nut threadedly mounted on said lead screw for axial movement longitudinally of the screw upon rotation of the screw, means carried by said nut operatively connecting the same with a landing gear for raising and lowering the same with the movement of said nut, driving means for turning the screw in one direction for raising the landing gear to retracted relation, said driving means including a clutch which is open when the landing gear is in retracted relation; whereby the screw has free rotation in the opposite direction when the landing gear is in retracted relation, and said nut by the weight of the landing gear thereon being adapted to rotate said screw to lower the landing gear from retracted to projected relation.

2. In a landing gear actuator, a high pitch lead screw mounted for turning movement in opposite directions, a nut threadedly mounted on said lead screw for axial movement longitudinally of the screw upon rotation of the screw, means carried by said nut operatively connecting the same with a landing gear for raising and lowering the same with the movement of said nut, driving means for turning the screw in one direction for raising the landing gear to retracted relation, said driving means including a clutch which is open when the landing gear is in retracted relation; whereby the screw has free rotation in the opposite direction when the landing gear is in retracted relation, said nut by the weight of the landing gear thereon being adapted to rotate said screw to lower the landing gear from retracted to projected relation, a cam carried by said screw, and a pawl adapted to engage said cam to lock the screw against rotation thereof by the weight of the aircraft transmitted to the nut through the screw when the landing gear is in projected relation.

3. In a landing gear actuator, a high pitch lead screw mounted for turning movement in opposite directions, a nut threadedly mounted on said lead screw for axial movement longitudinally of the screw upon rotation of the screw, means carried by said nut operatively connecting the same with a landing gear for raising and lowering the same with the movement of said nut, a gear mounted on said screw for turning the same, driving means for turning the gear in one direction for raising the landing gear and said driving means permitting of the free rotation of the screw in the opposite direction, said nut by the weight of the landing gear thereon being adapted to rotate said screw to lower the landing gear from retracted to projected relation, a cam carried by said screw, a pawl adapted to engage said cam to lock the screw against rotation thereof by the weight of the aircraft transmitted to the nut through the screw when the landing gear is in projected relation, and said gear having a cam adapted to engage said pawl to move the same out of engagement with said first mentioned cam when the gear is turned by said driving means to thereby permit said driving means to turn the screw for raising the landing gear.

4. In a landing gear actuator, a high pitch lead screw mounted for turning movement in opposite directions, a nut threadedly mounted on said lead screw for axial movement longitudinally of the screw upon rotation of the screw, means carried by said nut operatively connecting the same with a landing gear for raising and lowering the same with the movement of said nut, a clutch having normally open clutch parts, driving means, means operatively connecting one of said clutch parts with said driving means, means operatively connecting another of said clutch parts with said screw, and said clutch parts being adapted to engage when the rotation of the driving means reaches a predetermined speed for turning the screw, said clutch permitting of the independent rotation of the screw when the driving means is inoperative, and said nut by the weight of the landing gear thereon and the high pitch of said screw being adapted to rotate said screw to lower the landing gear from retracted to projected relation.

5. In a landing gear actuator, a high pitch lead screw mounted for turning movement in opposite directions, a nut threadedly mounted on said lead screw for axial movement longitudinally of the screw upon rotation of the screw, means carried by said nut operatively connecting the same with a landing gear for raising and lowering the same with the movement of said nut, a clutch having normally open clutch parts, driving means, means operatively connecting one of said clutch parts with said driving means, means operatively connecting another of said clutch parts with said screw, and said clutch parts being adapted to engage when the rotation of the driving means reaches a predetermined speed for turning the screw, said clutch permitting of the independent rotation of the screw when the driving means is inoperative, said nut by the weight of the landing gear thereon and the high pitch of said screw being adapted to rotate said screw to lower the landing gear from retracted to projected relation, a cam carried by said screw, and a pawl adapted to engage said cam to lock the screw against rotation thereof by the weight of the aircraft transmitted to the nut through the screw when the landing gear is in projected relation.

6. In a landing gear actuator, a high pitch lead screw mounted for turning movement in opposite directions, a nut threadedly mounted on said lead screw for axial movement longitudinally of the screw upon rotation of the screw, means carried by said nut operatively connecting the same with a landing gear for raising and lowering the same with the movement of said nut, a gear mounted on said screw for turning the same, driving means operatively connected with said gear, a normally open clutch interposed between said driving means and said gear and adapted to engage when the rotation of the driving means reaches a predetermined speed for turning the gear, said clutch permitting of the independent rotation of the screw when the driving means is inoperative, said nut by the weight of the landing gear thereon and the high pitch of said screw being adapted to rotate said screw to lower the landing gear from retracted to projected relation, a cam carried by said screw, a pawl adapted to engage said cam to lock the screw against rotation thereof by the weight of the aircraft transmitted to the nut through the screw when the landing gear is in projected relation, and said gear having a cam adapted to engage said pawl to move the same out of engagement with said first mentioned cam when the gear is turned by said driving means to thereby permit said driving means to turn the screw for raising the landing gear.

OWEN H. GRISWOLD.

References Cited in the file of this patent

UNITED STATES PATENTS

| Number | Name | Date |
| --- | --- | --- |
| 2,148,972 | Waseige | Feb. 28, 1939 |
| 2,283,476 | Waibel | May 19, 1942 |
| 2,330,894 | Jezler | Oct. 5, 1943 |
| 2,422,905 | Jackson | June 24, 1947 |
| 2,480,212 | Baines | Aug. 30, 1949 |
| 2,482,568 | Werner | Sept. 20, 1949 |